US012801784B2

(12) United States Patent
Mihara

(10) Patent No.: US 12,801,784 B2
(45) Date of Patent: Nov. 17, 2026

(54) INFORMATION MANAGEMENT DEVICE

(71) Applicant: TOYOTA JIDOSHA KABUSHIKI KAISHA, Toyota (JP)

(72) Inventor: Dai Mihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 19/043,999

(22) Filed: Feb. 3, 2025

(65) Prior Publication Data

US 2025/0265368 A1 Aug. 21, 2025

(30) Foreign Application Priority Data

Feb. 16, 2024 (JP) ................................ 2024-022078

(51) Int. Cl.
*G06F 21/62* (2013.01)

(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS 11,907,396 B2 * 2/2024 Sahib .................. G06F 21/6245
2014/0306834 A1 * 10/2014 Ricci ...................... G06Q 50/40 340/902
2020/0051346 A1 * 2/2020 Zhang ................... H04W 12/02
2021/0049527 A1 * 2/2021 Beaumont ............ G06Q 50/265
2022/0382903 A1 * 12/2022 Herman ................ G06V 20/52
2023/0214521 A1 * 7/2023 Amico .................. G06Q 50/40 726/1
2023/0316445 A1 * 10/2023 Mesde .................. G06Q 10/06 705/325

FOREIGN PATENT DOCUMENTS

JP 2021-170016 A 10/2021

* cited by examiner

*Primary Examiner* — Techane Gergiso
*Assistant Examiner* — Kamryn J Gillespie
(74) *Attorney, Agent, or Firm* — Oliff PLC

(57) ABSTRACT

An information management device for installation in a vehicle includes data processing hardware, storage, and a user interface. A switch module determines whether to operate each of a user consent acquisition module, a correction module, and a deletion module in accordance with a jurisdiction where the vehicle is located. The user consent acquisition module stores a privacy setting in the storage in association with the jurisdiction in which the vehicle is located. The correction module corrects a stored privacy information item in accordance with a correction request. The deletion module deletes a stored privacy information item in accordance with a deletion request.

4 Claims, 6 Drawing Sheets

INFORMATION MANAGEMENT DEVICE

CROSS-REFERENCE TO RELATED APPLICATIONS

This application is based upon and claims the benefit of priority from Japanese Patent Application No. 2024-022078, filed on Feb. 16, 2024, the entire contents of which are incorporated herein by reference.

BACKGROUND

1. Field

The following description relates to an information management device for installation in a vehicle.

2. Description of Related Art

Japanese Laid-Open Patent Publication No. 2021-170016 discloses an information management device installed in a vehicle. The information management device inquires of a user of the vehicle as to whether the user will permit storage of privacy information regarding the user in a persistent storage device. The privacy information includes, for example, the name of the user, the credit card number, the position information of the user, or the speed of the vehicle.

When the user permits storage of the privacy information in the storage device, the information management device stores the privacy information in the persistent storage device. When the user refuses storage of the privacy information in the persistent storage device, the information management device uses the privacy information regarding the user by unloading the privacy information to volatile memory. In such a case, the privacy information regarding the user will not be stored in the persistent storage device.

The privacy regulation that is in effect may differ from one jurisdiction to another. A jurisdiction is, for example, a country, a state, or a province. For example, some jurisdictions may require user consent to store privacy information items in a persistent storage device, and other jurisdictions do not require such user consent.

Accordingly, functionalities for adequately protecting the privacy information may vary depending on the privacy regulation in different jurisdictions. As a result, when a vehicle moves to a jurisdiction with a different privacy regulation, the privacy information may not be protected adequately.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information management device for installation in a vehicle includes data processing hardware, storage configured to communicate with the data processing hardware, and a user interface configured to communicate with the data processing hardware. The data processing hardware includes a user consent acquisition module, a correction module, a deletion module, and a switch module. The user consent acquisition module is configured to set on the user interface a display for accepting a privacy setting that indicates whether to permit storage of one or more privacy information items in the storage from a user. The user consent acquisition module is configured to receive the privacy setting from the user interface, and store the privacy setting in the storage in association with a jurisdiction in which the vehicle is located. The correction module is configured to set on the user interface a display for accepting a correction request to correct a privacy information item stored in the storage among the one or more privacy information items. The correction module is configured to receive the correction request from the user interface, and correct the stored privacy information item in accordance with the correction request. The deletion module is configured to set on the user interface a display for accepting a deletion request to delete a privacy information item stored in the storage among the one or more privacy information items. The deletion module is configured to receive the deletion request from the user interface, and delete the stored privacy information item in accordance with the deletion request. The switch module is configured to determine whether to operate each of the user consent acquisition module, the correction module, and the deletion module in accordance with the jurisdiction in which the vehicle is located at a time point at which a drive system of the vehicle is turned on.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information management device in accordance with an embodiment will now be described with reference to the drawings.

Configuration of Information Management Device 100

Figure 1:
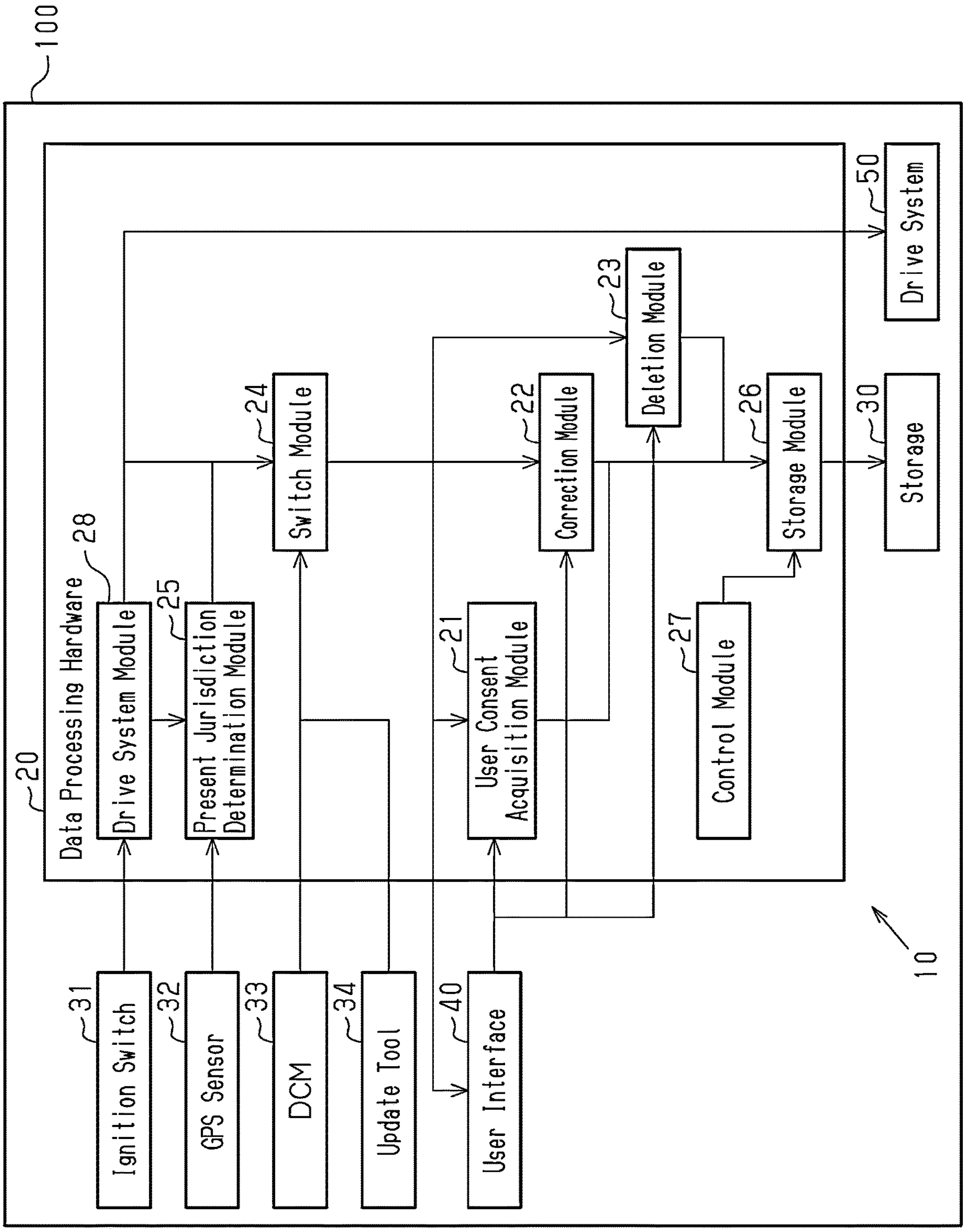
FIG. 1 is a diagram illustrating an information management device according to an embodiment mounted on a vehicle.

A configuration of an information management device 10 mounted on a vehicle 100 will be described with reference to FIG. 1. The information management device 10 includes data processing hardware 20, a storage 30, and a user interface 40. Each of the storage 30 and the user interface 40 is configured to communicate with the data processing hardware 20.

The vehicle 100 includes an ignition switch 31. The data processing hardware 20 includes a drive system module 28. When the user presses the ignition switch 31, the drive system module 28 turns on the drive system 50 of the vehicle 100. Accordingly, the switch module 24, the present jurisdiction determination module 25, the storage module 26, and the control module 27 are turned on. Details of these modules included in the data processing hardware 20 will be described later.

A global positioning system (GPS) sensor 32 is provided in the vehicle 100. The present jurisdiction determination module 25 determines the jurisdiction in which the vehicle 100 is located based on the location information of the vehicle 100 acquired via the GPS sensor 32. The present jurisdiction determination module 25 provides information indicating the jurisdiction in which the vehicle 100 is located to the switch module 24. The jurisdiction is, for example, a country, a state, or a province. A plurality of countries may constitute one jurisdiction.

The switch module 24 determines whether to operate the privacy protection module group in accordance with the jurisdiction in which the vehicle 100 is located when the drive system 50 of the vehicle 100 is turned on. The privacy protection module group includes a user consent acquisition module 21, a correction module 22, and a deletion module 23. The privacy protection module group will be described later. The process of determining whether to operate the privacy protection module group is the module operation determination process shown in step S314 of FIG. 3 and FIG. 4. As will be described later with reference to step S310 in FIG. 3, the switch module 24 also executes the module operation determination process immediately after switching from the restriction mode to the normal mode. As will be described later with reference to step S316 in FIG. 3, the restriction mode is a mode that is set when the position of the vehicle 100 cannot be acquired. The normal mode is a mode set when the position of the vehicle 100 can be acquired, as will be described later with reference to step S302 in FIG. 3. As will be described later with reference to step S312 in FIG. 3, the switch module 24 also executes the module operation determination process when the jurisdiction in which the vehicle 100 is currently located is different from the jurisdiction in which the vehicle 100 was previously determined to be located.

A data communication module (DCM) 33 is provided in the vehicle 100. The DCM 33 can communicate with a device outside the vehicle 100. As described above, the switch module 24 executes the module operation determination process in accordance with the jurisdiction in which the vehicle 100 is located at the time when the drive system 50 of the vehicle 100 is turned on. The module operation determination process executed by the switch module 24 can be changed via the DCM 33. For example, for a certain jurisdiction, a mode in which only the user consent acquisition module 21 is operated can be changed to a mode in which all of the privacy protection module group is operated. The update tool 34 may be provided in the vehicle 100. The module operation determination process can be changed by connecting the update tool 34 to the vehicle 100 by wire.

A user interface 40 is provided in the vehicle 100. The user interface 40 is, for example, a touch display that receives an input from a user.

The privacy protection modules included in the data processing hardware 20 will be described in detail below.

The user consent acquisition module 21 sets on the user interface 40 a display for accepting privacy settings from the user. The privacy setting indicates whether one or more privacy information items are permitted to be stored in the storage 30. The user consent acquisition module 21 receives the privacy setting from the user interface 40. The user consent acquisition module 21 stores the privacy setting in the storage 30 in association with the jurisdiction in which the vehicle 100 is located. The privacy settings are stored in the storage 30 via the storage module 26.

The correction module 22 sets on the user interface 40 a display for receiving a correction request. The correction request is a request for correcting one privacy information item stored in the storage 30 among one or more privacy information items. The correction module 22 receives a correction request from the user interface 40. The correction module 22 corrects the stored one privacy information item according to the correction request. The stored one privacy information item is corrected via the storage module 26.

The deletion module 23 sets on the user interface 40 a display for receiving a deletion request. The deletion request is a request to delete one privacy information item stored in the storage 30 among one or more privacy information items. The deletion module 23 receives a deletion request from the user interface 40. The deletion module 23 deletes the stored one privacy information item according to the deletion request. The deletion of one stored privacy information item is performed via the storage module 26.

As described above, the data processing hardware 20 includes the control module 27. The control module 27 requests the storage module 26 to store the privacy information item in the storage 30 according to the privacy setting.

Example of Screen Display 200 in User Interface 40

An example of a screen display 200 in the user interface 40 will be described with reference to FIG. 2. The screen display 200 in the user interface 40 includes four privacy information items. These four privacy information items are surrounded by a dash-dot line 202 in FIG. 2. The four privacy information items are the name, the credit card number, the position information of the vehicle 100, and the speed of the vehicle 100. The one or more privacy information items displayed on the user interface 40 may vary from jurisdiction to jurisdiction.

The screen display 200 in the user interface 40 indicates the presence or absence of consent to each of the four privacy information items. The display of the presence or absence of agreement is surrounded by a one dot chain line 204 in FIG. 2. In the example shown in FIG. 2, the user agrees to store the name, the credit card number, and the speed of the vehicle 100 in the storage 30. The user does not agree to store the position information of the vehicle 100 in the storage 30. In the example illustrated in FIG. 2, the presence or absence of consent is indicated for each of the four privacy information items. Alternatively, the presence or absence of consent may be collectively indicated for all the privacy information items.

Figure 2:
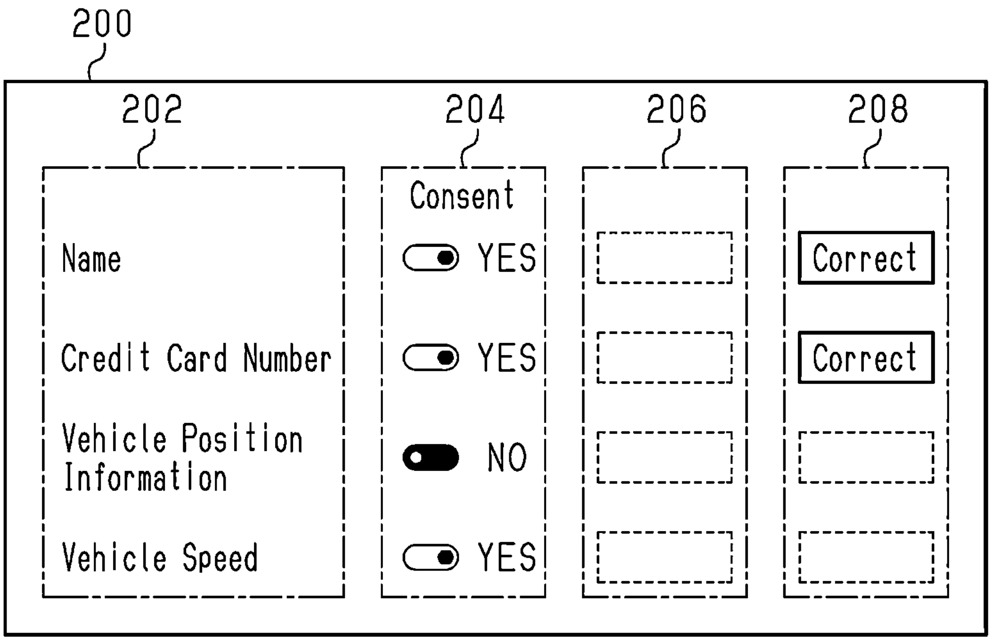
FIG. 2 is a diagram illustrating an example of a screen display in the user interface.

In the example shown in FIG. 2, the user consent acquisition module 21 is operating. In some jurisdictions, the user consent acquisition module 21 may not be running. In other words, whether to operate the user consent acquisition module 21 is determined for each jurisdiction. When the user consent acquisition module 21 is operated, which one or more privacy information items are to be inquired of the user about collection permission is determined for each jurisdiction.

In the example illustrated in FIG. 2, the deletion module 23 is not operating. One or more privacy information items may be undeletable or may be automatically deleted. For example, when the vehicle 100 moves from the first jurisdiction to the second jurisdiction, one or more privacy information items associated with the first jurisdiction may be automatically deleted. Unlike the example shown in FIG. 2, when the deletion module 23 is operating, one to four deletion buttons may be displayed in the area surrounded by the alternate long and short dash line 206 in Fig. That is, whether to operate the deletion module 23 is determined for each jurisdiction. When the deletion module 23 is operated, it is determined which of one or more privacy information items can be deleted by the user.

In the example shown in FIG. 2, the correction module 22 is in operation. In the example shown in FIG. 2, the name and the credit card number can be corrected. On the other hand, the position information of the vehicle 100 and the speed of the vehicle 100 cannot be corrected. In an area surrounded by a one dot chain line 208 in FIG. 2, a correction button for correcting the name and a correction button for correcting the credit card number are displayed. In the example shown in FIG. 2, only the privacy information item manually input by the user can be corrected, whereas the privacy information item automatically input cannot be corrected. In some jurisdictions, all privacy information items may be correctable. That is, depending on the jurisdiction, correction is possible regardless of whether the user has made an input. In some jurisdictions, the correction module 22 may not be activated. In this way, whether to operate the correction module 22 is determined for each jurisdiction. When the correction module 22 is operated, it is determined which of one or more privacy information items can be corrected by the user.

Outline of Processing Executed by Information Management Device 10

An overview of a process executed by the information management device 10 will be described with reference to FIG. 3.

Figure 3:
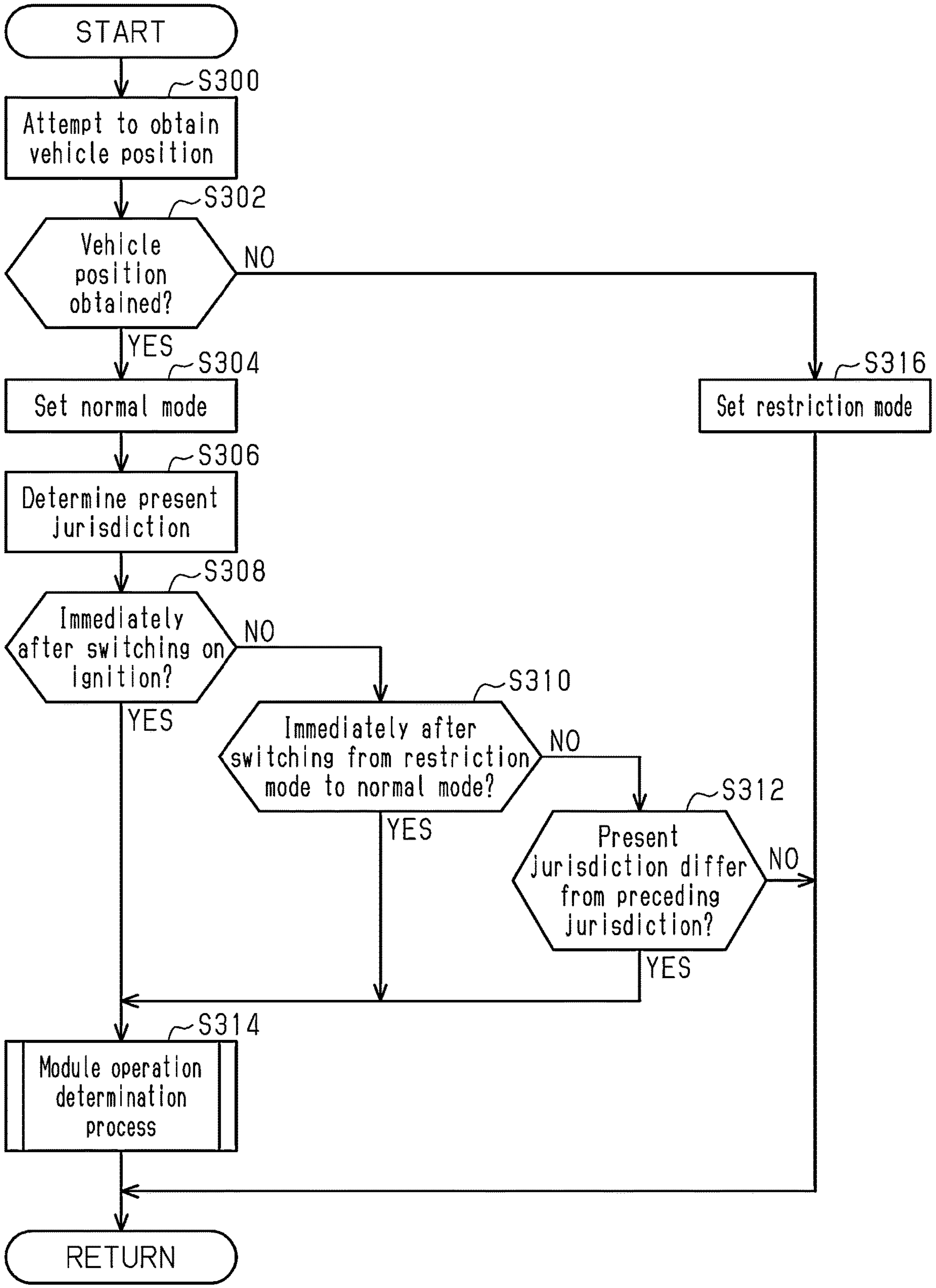
FIG. 3 is a flowchart showing a process executed by the information management device shown in FIG. 1.

The information management device 10 repeatedly executes the processing shown in FIG. 3 at a predetermined cycle at all times during the operation of the drive system 50. The information management device 10 attempts to acquire the position of the vehicle 100 in step S300. Next, the information management device 10 proceeds to step S302. In step S302, the information management device 10 determines whether the position of the vehicle 100 have been acquired. If a negative determination is made in step S302 (S302: NO), the information management device 10 proceeds to step S316. In step S316, the information management device 10 sets the restriction mode. That is, when the position of the vehicle 100 cannot be acquired, the switch module 24 transitions to the restriction mode. The restriction mode is a mode in which the operation of one or more of the user consent acquisition module 21, the correction module 22, and the deletion module 23 is stopped regardless of jurisdiction. For example, in the restriction mode, the information management device 10 according to the present embodiment stops the operation of all of the user consent acquisition module 21, the correction module 22, and the deletion module 23 regardless of the jurisdiction.

If a positive determination is made in step S302 (S302: YES), the information management device 10 proceeds to step S304. In step S304, the information management device 10 sets the normal mode. The normal mode is a mode in which the restriction mode is not imposed. Next, the information management device 10 proceeds to step S306.

In step S306, the information management device 10 determines the jurisdiction in which the vehicle 100 is currently located based on the position of the vehicle 100. Next, the information management device 10 proceeds to step S308. In step S308, the information management device 10 determines whether it is immediately after the ignition switch 31 is turned on. If a positive determination is made in step S308 (S308: YES), the information management device 10 proceeds to step S314. If a negative determination is made in step S308 (S308: NO), the information management device 10 proceeds to step S310. In step S310, the information management device 10 determines whether the switch module 24 has just switched from the restriction mode to the normal mode. If a positive determination is made in step S310 (S310: YES), the information management device 10 proceeds to step S314. If a negative determination is made in step S310 (S310: NO), the information management device 10 proceeds to step S312. In step S312, the information management device 10 determines whether the jurisdiction in which the vehicle 100 is currently located is different from the jurisdiction in which the vehicle 100 was previously determined to be located. If a positive determination is made in step S312 (S312: YES), the information management device 10 proceeds to step S314.

In step S314, the information management device 10 executes a module operation determination process to be described later with reference to FIG. 4.

When a negative determination is made in step S312 (S312: NO), the information management device 10 ends the process illustrated in FIG. 3. The information management device 10 also ends the process illustrated in FIG. 3 when step S314 or step S316 is completed.

Module Operation Determination Process

The module operation determination process in step S314 of FIG. 3 will be described with reference to FIG. 4. As shown in step S306 of FIG. 3, the information management device 10 grasps the jurisdiction where the vehicle 100 is currently located. In step S400, the information management device 10 determines whether the module operation information related to the jurisdiction where the vehicle 100 is currently located has been stored in the storage 30. The module operation information is information indicating whether to operate the privacy protection module group. If a negative determination is made in step S400 (S400: NO), the information management device 10 proceeds to step S424. In step S424, the information management device 10 attempts to acquire the module operation information related to the jurisdiction where the vehicle 100 is currently located. For example, the information management device 10 requests the module operation information from a data center installed in a jurisdiction where the vehicle 100 is currently located. Next, the information management device 10 proceeds to step S426. In step S426, the information management device 10 determines whether the module operation information related to the jurisdiction in which the vehicle 100 is currently located has been acquired. If a positive determination is made in step S426 (S426: YES), the information management device 10 proceeds to step S402. If a negative determination is made in step S426 (S426: NO), the information management device 10 proceeds to step S428. In step S428, the information management device 10 disables all of the user consent acquisition module 21, the correction module 22, and the deletion module 23.

If a positive determination is made in step S400 (S400: YES), the information management device 10 proceeds to step S402. The module operation information related to the jurisdiction in which the vehicle 100 is currently located indicates whether to operate the user consent acquisition module 21 in the jurisdiction in which the vehicle 100 is currently located. In step S402, the information management device 10 determines whether to operate the user consent acquisition module 21. If a positive determination is made in step S402 (S402: YES), the information management device 10 proceeds to step S404. In step S404, the information management device 10 operates the user consent acquisition module 21. Next, the information management device 10 proceeds to step S406. In step S406, the information management device 10 determines whether the privacy setting related to the jurisdiction in which the vehicle 100 is currently located has been stored in the storage 30. If a positive determination is made in step S406 (S406: YES), the information management device 10 proceeds to step S412. If a negative determination is made in step S406 (S406: NO), the information management device 10 proceeds to step S408. In step S408, the information management device 10 acquires the privacy setting by making an inquiry to the user.

If a negative determination is made in step S402 (S402: NO), the information management device 10 proceeds to step S410. In step S410, the information management device 10 prohibits the operation of the user consent acquisition module 21. The information management device 10 also proceeds to step S408 when step S410 or step S412 is completed.

The module operation information related to the jurisdiction in which the vehicle 100 is currently located indicates whether to operate the correction module 22 in the jurisdiction in which the vehicle 100 is currently located. In step S412, the information management device 10 determines whether to operate the correction module 22. If a positive determination is made in step S412 (S412: YES), the information management device 10 proceeds to step S414. In step S414, the information management device 10 operates the correction module 22.

If a negative determination is made in step S412 (S412: NO), the information management device 10 proceeds to step S416. In step S416, the information management device 10 prohibits the operation of the correction module 22. When the correction module 22 is in operation, the information management device 10 prohibits the operation and stops the operation of the correction module 22.

When step S414 or step S416 is completed, the information management device 10 proceeds to step S418.

The module operation information related to the jurisdiction in which the vehicle 100 is currently located indicates whether to operate the deletion module 23 in the jurisdiction in which the vehicle 100 is currently located. In step S418, the information management device 10 determines whether to operate the deletion module 23. If a positive determination is made in step S418 (S418: YES), the information management device 10 proceeds to step S420. In step S420, the information management device 10 operates the correction module 22.

If a negative determination is made in step S418 (S418: NO), the information management device 10 proceeds to step S422. In step S422, the information management device 10 prohibits the operation of the deletion module 23. When the deletion module 23 is in operation, the information management device 10 prohibits the operation and stops the operation of the deletion module 23.

Figure 4:
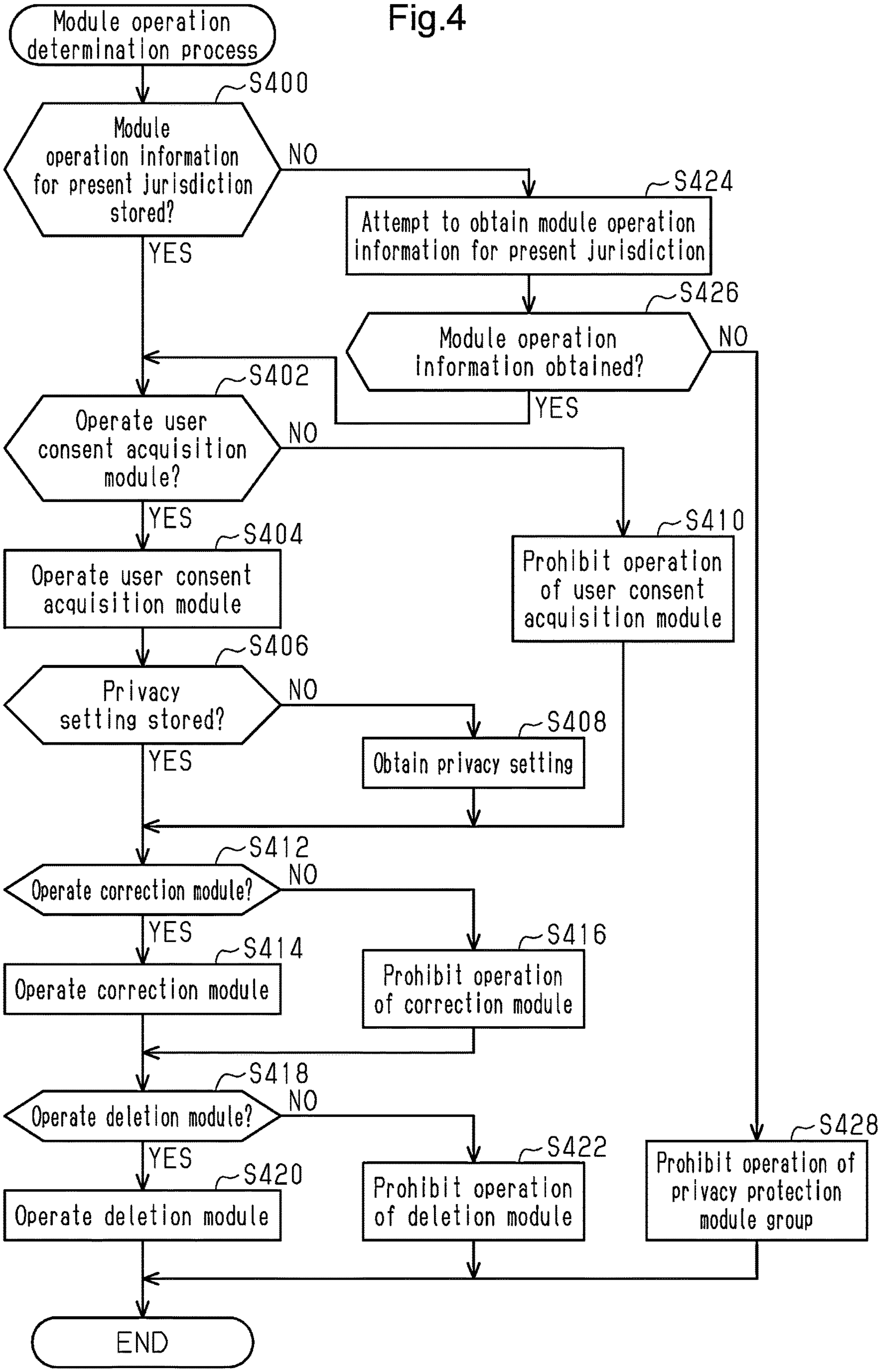
FIG. 4 is a flowchart showing the module operation determination process shown in FIG. 3.

When step S420, step S422, or step S428 is completed, the information management device 10 ends the flow of FIG. 4.

Process for Repeatedly Inquiring of User About Privacy Settings

Figure 5:
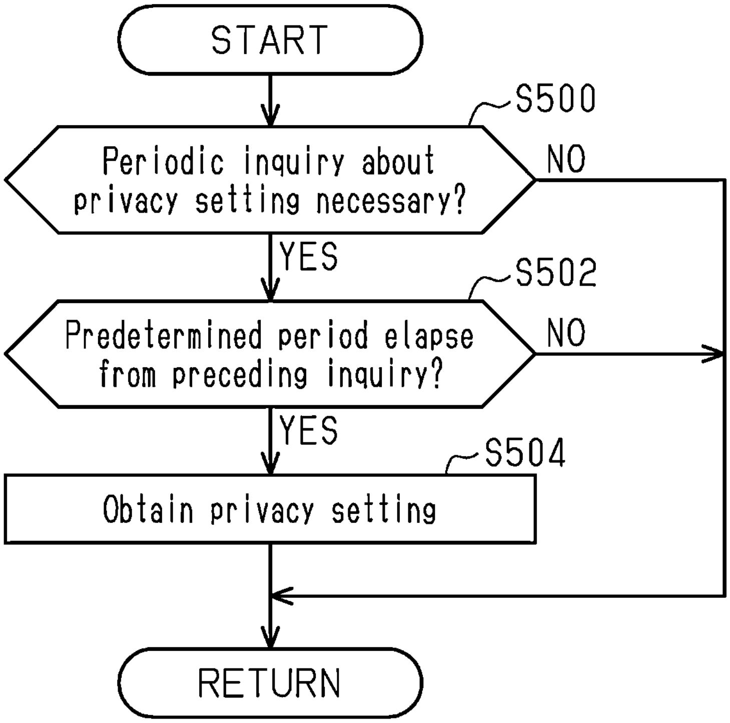
FIG. 5 is a flow chart illustrating a process for complying with the privacy regulations of a jurisdiction that requires repeatedly querying users for privacy settings.

Referring to FIG. 5, a process for complying with a privacy regulation in a jurisdiction that requires repeatedly querying a user for privacy settings will be described. The process shown in FIG. 5 is repeatedly executed when the process shown in FIG. 4 is not executed and the normal mode is set.

In step S500, the information management device 10 determines whether it is necessary to periodically inquire of the user about the privacy setting in the jurisdiction where the vehicle 100 is currently located. That is, the information management device 10 determines whether the laws and regulations in the jurisdiction in which the vehicle 100 is currently located prescribe that the privacy setting be periodically confirmed by the user. For example, the module operation information includes information indicating whether it is necessary to periodically inquire of the user about the privacy setting.

If a positive determination is made in step S500 (S500: YES), the information management device 10 proceeds to step S502. In step S502, the information management device 10 determines whether a predetermined period has elapsed from the previous query. If a positive determination is made in step S502 (S502: YES), the information management device 10 proceeds to step S504.

In step S504, the information management device 10 acquires the privacy setting by inquiring of the user.

When completing the step S504, the information management device 10 ends the flow of FIG. 5. When a negative determination is made in step S500 (S500: NO), the information management device 10 also ends the flow of FIG. 5. When a negative determination is made in step S502 (S502: NO), the information management device 10 also ends the flow of FIG. 5.

Privacy Setting for Jurisdictions Adjacent to Jurisdiction where Vehicle 100 is Currently Located With reference to FIG. 6, a process for acquiring the privacy setting related to the jurisdiction adjacent to the jurisdiction where the vehicle 100 is currently located will be described. The information management device 10 repeatedly executes the process of FIG. 6 when the normal mode is set.

In step S600, the information management device 10 determines whether the vehicle 100 is within a predetermined range from the boundary of a jurisdiction adjacent to the jurisdiction in which the vehicle 100 is currently located. When a negative determination is made in step S600 (S600: NO), the information management device 10 repeats step S600. If a positive determination is made in step S600 (S600: YES), the information management device 10 proceeds to step S602.

In step S602, the information management device 10 determines whether the module operation information of the jurisdiction adjacent to the jurisdiction where the vehicle 100 is currently located has been stored in the storage 30. If a positive determination is made in step S602 (S602: YES), the information management device 10 proceeds to step S608. If a negative determination is made in step S602 (S602: NO), the information management device 10 proceeds to step S604. In step S604, the information management device 10 attempts to acquire module operation information of a jurisdiction adjacent to the jurisdiction in which the vehicle 100 is currently located. Next, the information management device 10 proceeds to step S606. In step S606, the information management device 10 determines whether the module operation information of the jurisdiction adjacent to the jurisdiction where the vehicle 100 is currently located can be acquired. If a positive determination is made in step S606 (S606: YES), the information management device 10 proceeds to step S608. When a negative determination is made in step S606 (S606: NO), the information management device 10 ends the flow of FIG. 6.

The module operation information of the jurisdiction adjacent to the jurisdiction where the vehicle 100 is currently located includes information indicating whether the user consent acquisition module 21 is operated in the adjacent jurisdiction. In step S608, the information management device 10 determines whether to operate the user consent acquisition module 21 in a jurisdiction adjacent to the jurisdiction where the vehicle 100 is currently located. When a negative determination is made in step S608 (S608: NO), the information management device 10 ends the flow of FIG. 6. If a positive determination is made in step S608 (S608: YES), the information management device 10 proceeds to step S610. In step S610, the information management device 10 determines whether the privacy setting related to the jurisdiction adjacent to the jurisdiction in which the vehicle 100 is currently located has been stored in the storage 30. When a positive determination is made in step S610 (S610: YES), the information management device 10 ends the flow of FIG. 6. If a negative determination is made in step S610 (S610: NO), the information management device 10 proceeds to step S612. In step S612, the information management device 10 acquires the privacy setting related to the jurisdiction adjacent to the jurisdiction in which the vehicle 100 is currently located by inquiring of the user. When completing the step S612, the information management device 10 ends the flow of FIG. 6.

Operation of the Present Embodiment

According to step S306 in FIG. 3, the information management device 10 repeatedly determines the jurisdiction in which the vehicle 100 is currently located while the drive system 50 is on. The module operation information of the jurisdiction in which the vehicle 100 is currently located is information indicating whether to operate the privacy protection module group. The privacy protection module group includes a user consent acquisition module 21, a correction module 22, and a deletion module 23. When an affirmative determination is made in step S308, step S310, or step S312, the module operation determination process shown in step S314 and FIG. 4 is executed. In particular, according to steps S308 and S314, this process is performed in accordance with the jurisdiction in which the vehicle 100 is located at the time when the drive system 50 of the vehicle 100 is turned on. In the module operation determination process, as shown in steps S402 to S422, it is determined whether the privacy protection module group is operated.

According to step S310 and step S314 in FIG. 3, the following can be said. When the position of the vehicle 100 can be acquired, the switch module 24 performs the following process. That is, the switch module 24 determines whether to operate each of the user consent acquisition module 21, the correction module 22, and the deletion module 23 in accordance with the jurisdiction in which the vehicle 100 is located.

According to step S312 and step S314 in FIG. 3, the following can be said. The switch module 24 may cause the vehicle 100 to move from the first jurisdiction to the second jurisdiction during operation of the drive system 50 of the vehicle 100. In this case, the switch module 24 determines whether to operate each of the user consent acquisition module 21, the correction module 22, and the deletion module 23 in accordance with the second jurisdiction.

According to steps S402 to S406, the following can be said. When the vehicle 100 is located in the jurisdiction where the user consent acquisition module 21 is operated, the information management device 10 operates the user consent acquisition module 21. When the privacy setting associated with the jurisdiction is stored in the storage 30, the user consent acquisition module 21 does not inquire of the user about the privacy setting. That is, the user consent acquisition module 21 does not sets on the user interface 40 the display for accepting the privacy setting from the user.

According to FIG. 5, the following can be said. The laws and regulations in the jurisdiction in which the vehicle 100 is currently located may stipulate that the user be periodically asked whether to allow the privacy information item to be stored in the storage 30. In such a case, even when the privacy setting associated with the jurisdiction is stored in the storage 30, the user consent acquisition module 21 periodically inquires of the user about the privacy setting. That is, the user consent acquisition module 21 sets on the user interface 40 a display for receiving the privacy setting from the user.

Advantages of the Present Embodiment (1) The information management device 10 for installation in the vehicle 100 includes the data processing hardware 20. The information management device 10 includes the storage 30 configured to communicate with the data processing hardware 20. The information management device 10 includes the user interface 40 configured to communicate with the data processing hardware 20. The data processing hardware 20 includes the user consent acquisition module 21. The user consent acquisition module 21 sets on the user interface 40 a display for accepting a privacy setting that indicates whether to permit storage of one or more privacy information items in the storage 30 from the user. The user consent acquisition module 21 receives the privacy setting from the user interface 40. The user consent acquisition module 21 stores the privacy setting in the storage 30 in association with the jurisdiction in which the vehicle 100 is located. The data processing hardware 20 includes the correction module 22. The correction module 22 sets on the user interface 40 a display for accepting a correction request to correct a privacy information item stored in the storage 30 among the one or more privacy information items. The correction module 22 receives the correction request from the user interface 40. The correction module 22 corrects the stored privacy information item in accordance with the correction request. The data processing hardware 20 includes the deletion module 23. The deletion module 23 sets on the user interface 40 a display for accepting a deletion request to delete of a privacy information item stored in the storage 30 among the one or more privacy information items. The deletion module 23 receives the deletion request from the user interface 40. The deletion module 23 deletes the stored privacy information item in accordance with the deletion request. The data processing hardware 20 includes the switch module 24. The switch module 24 determines whether to operate each of the user consent acquisition module 21, the correction module 22, and the deletion module 23. This determination is performed in accordance with the jurisdiction in which the vehicle 100 is located at a time point at which the drive system 50 of the vehicle 100 is turned on.

With the above configuration, the switch module 24 determines whether to operate each of the user consent acquisition module 21, the correction module 22, and the deletion module 23 in accordance with the jurisdiction. This operates the necessary modules in accordance with the privacy regulation in different jurisdictions. Therefore, the above configuration adequately protects the privacy information in accordance with the privacy regulation in different jurisdictions.

(2) The vehicle 100 may be located in a first jurisdiction in which the user consent acquisition module 21 is operated. Even in such a case, when the privacy setting associated with the first jurisdiction is stored in the storage 30, the inquiry about the privacy setting will not be conducted. Specifically, the user consent acquisition module 21 does not set on the user interface 40 the display for accepting the privacy setting from the user.

With the above configuration, when the privacy setting associated with the first jurisdiction is stored, the user consent acquisition module 21 does not inquire of the user about the privacy setting. Thus, the user will not be bothered by the inquiry about the privacy setting.

(3) The regulation in a first jurisdiction may stipulate that the user be periodically checked whether the user permits storage of the privacy information items in the storage 30. In such a case, even when the privacy setting associated with the first jurisdiction is stored in the storage 30, the inquiry about the privacy setting will be conducted. Specifically, the user consent acquisition module 21 periodically sets on the user interface 40 the display for receiving the privacy setting from the user.

The above configuration adequately protects the privacy information in accordance with the privacy regulation of a jurisdiction that stipulates that the user be repeatedly inquired of about the privacy setting.

(4) The position of the vehicle 100 may not be obtained. In such a case, the switch module 24 shifts to the restriction mode that stops the operation of one or more of the user consent acquisition module 21, the correction module 22, and the deletion module 23, regardless of the jurisdiction. When the position of the vehicle 100 becomes obtainable, the switch module 24 shifts to the normal mode. When the switch module 24 shifts to the normal mode, the switch module 24 performs the following determination. Specifically, the switch module 24 determines whether to operate each of the user consent acquisition module 21, the correction module 22, and the deletion module 23 in accordance with the jurisdiction in which the vehicle 100 is located.

In a situation in which the position of the vehicle 100 cannot be obtained, the operation of one or more of the user consent acquisition module 21, the correction module 22, and the deletion module 23 is stopped. When the position of the vehicle 100 becomes obtainable, the switch module 24 determines whether to operate each module in accordance with the jurisdiction in which the vehicle 100 is located. In this manner, when the position of the vehicle 100 becomes obtainable, the processes related to the privacy information may be executed again in accordance with the privacy regulation of the jurisdiction in which the vehicle 100 is located.

(5) The vehicle 100 may move from a first jurisdiction to a second jurisdiction during operation of the drive system 50 of the vehicle 100. In such a case, the switch module 24 determines whether to operate each of the user consent acquisition module 21, the correction module 22, and the deletion module 23 in accordance with the second jurisdiction.

During operation of the drive system 50 of the vehicle 100, the vehicle 100 may move from a first jurisdiction to a second jurisdiction in which the privacy regulation differs from that of the first jurisdiction. The above configuration adequately protects the privacy information in accordance with the privacy regulation of the second jurisdiction.

Modified Examples

The above embodiment may be modified as described below. The present embodiment and the following modifications can be combined as long as the combined modifications remain technically consistent with each other.

In the above embodiment, the privacy settings are stored in the storage 30 via the storage module 26. The stored one privacy information item is corrected via the storage module 26. The deletion of one stored privacy information item is performed via the storage module 26. However, the storage, correction, and deletion may be performed without using the storage module 26.

At least one of step S310 and step S312 in FIG. 3 may be omitted.

In the above-described embodiment, the restriction mode is a mode in which the operation of one or more of the user consent acquisition module 21, the correction module 22, and the deletion module 23 is stopped. However, such a configuration is merely an example. The restriction mode may be a mode in which it is determined whether to operate the privacy protection module group based on the module operation information of the jurisdiction in which the vehicle 100 is located immediately before the restriction mode is entered.

In the above-described embodiment, the information management device 10 prohibits all of the user consent acquisition module 21, the correction module 22, and the deletion module 23 from operating in step S428. However, such a configuration is merely an example. For example, the information management device 10 may prohibit the operation of one or more of the user consent acquisition module 21, the correction module 22, and the deletion module 23.

In the above embodiment, in step S400, the information management device 10 determines whether the module operation information related to the jurisdiction in which the vehicle 100 is currently located has been stored. For example, a mode is possible in which the module operation information related to all jurisdictions is stored in the storage 30 in advance. In such a case, steps S400, S424, S426, and S428 may be omitted.

The processing of FIG. 5 can be omitted.

Figure 6:
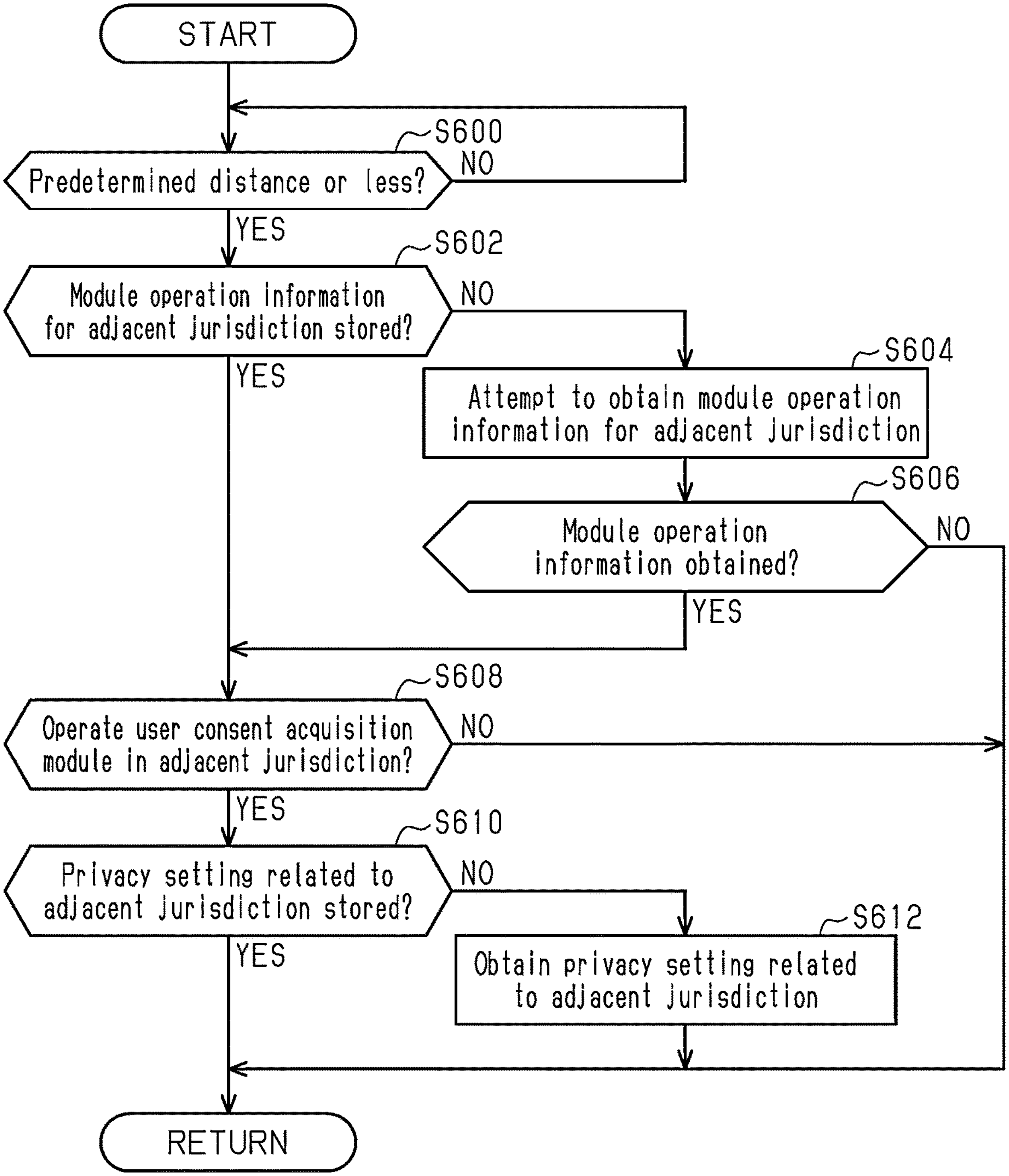
FIG. 6 is a flowchart illustrating a process for obtaining privacy settings for jurisdictions adjacent to the jurisdiction in which the vehicle is currently located.

The process of FIG. 6 can be omitted.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information management device for installation in a vehicle, the information management device comprising:

data processing hardware;

a storage configured to communicate with the data processing hardware; and a user interface configured to communicate with the data processing hardware, wherein the data processing hardware includes:

a user consent acquisition module configured to set on the user interface a display for accepting a privacy setting that indicates whether to permit storage of one or more privacy information items in the storage from a user, receive the privacy setting from the user interface, and store the privacy setting in the storage in association with a jurisdiction in which the vehicle is located;

a correction module configured to set on the user interface a display for accepting a correction request to correct a privacy information item stored in the storage among the one or more privacy information items, receive the correction request from the user interface, and correct the stored privacy information item in accordance with the correction request;

a deletion module configured to set on the user interface a display for accepting a deletion request to delete a privacy information item stored in the storage among the one or more privacy information items, receive the deletion request from the user interface, and delete the stored privacy information item in accordance with the deletion request; and a switch module configured to determine whether to operate each of the user consent acquisition module, the correction module, and the deletion module in accordance with the jurisdiction in which the vehicle is located at a time point at which a drive system of the vehicle is turned on, wherein:

when a position of the vehicle cannot be obtained, the switch module is configured to shift to a restriction mode that stops operation of one or more of the user consent acquisition module, the correction module, and the deletion module, regardless of the jurisdiction; and when the position of the vehicle becomes obtainable, the switch module is configured to determine whether to operate each of the user consent acquisition module, the correction module, and the deletion module in accordance with the jurisdiction in which the vehicle is located.

2. The information management device according to claim 1, wherein, even when the vehicle is located in a first jurisdiction in which the user consent acquisition module is operated, if the privacy setting associated with the first jurisdiction is stored in the storage, the user consent acquisition module does not set on the user interface the display for accepting the privacy setting from the user.

3. The information management device according to claim 2, wherein, when a regulation in the first jurisdiction stipulates that the user be periodically checked whether the user permits storage of the one or more privacy information items in the storage, the user consent acquisition module periodically sets on the user interface the display for accepting the privacy setting from the user even if the privacy setting associated with the first jurisdiction is stored in the storage.

4. The information management device according to claim 1, wherein, when the vehicle moves from a first jurisdiction to a second jurisdiction during operation of the drive system of the vehicle, the switch module is configured to determine whether to operate each of the user consent acquisition module, the correction module, and the deletion module in accordance with the second jurisdiction.

* * * * *